(12) United States Patent
Lee

(10) Patent No.: US 6,588,046 B1
(45) Date of Patent: Jul. 8, 2003

(54) WINDSHIELD WIPER PROTECTOR

(76) Inventor: Yuan-Chiang Lee, No. 131, Shinlung Rd., Lungtan Shiang, Taoyuan Hsien (TW)

( * ) Notice: Subject to any disclaimer, the term of this patent is extended or adjusted under 35 U.S.C. 154(b) by 0 days.

(21) Appl. No.: 10/071,416

(22) Filed: Feb. 8, 2002

(51) Int. Cl.[7] .................................................. B60S 1/32
(52) U.S. Cl. .............................. 15/250.19; 15/250.001; 318/DIG. 2
(58) Field of Search ........................ 15/250.19, 250.001, 15/250.202, 250.203, 250.351, 250.16, 250.17, 257.01; 318/DIG. 2

(56) References Cited

U.S. PATENT DOCUMENTS 2,784,438 A  * 3/1957 Petersen ................... 15/250.19
5,571,221 A  * 11/1996 Kuo et al. ................ 15/250.19
6,286,175 B1 * 9/2001 Lee .......................... 15/250.19

FOREIGN PATENT DOCUMENTS

| DE | 3731921 | * 12/1988 | ............... 15/250.19 |
| EP | 0812744 | * 12/1989 | ............... 15/250.19 |
| JP | 05-162616 | * 6/1993 | ............... 15/250.19 |

* cited by examiner

Primary Examiner—Gary K. Graham
(74) Attorney, Agent, or Firm—Thomas M. Freiburger

(57) ABSTRACT

Disclosed is a windshield wiper protector which lifts up the wiper from the surface of the front window when car is stopping or parking through collaborated action of a car engine initiation switch, a motor, a relay, and two stage gear speed reduction so as to keep the wiper away from contamination and prolong its lifetime.

3 Claims, 3 Drawing Sheets

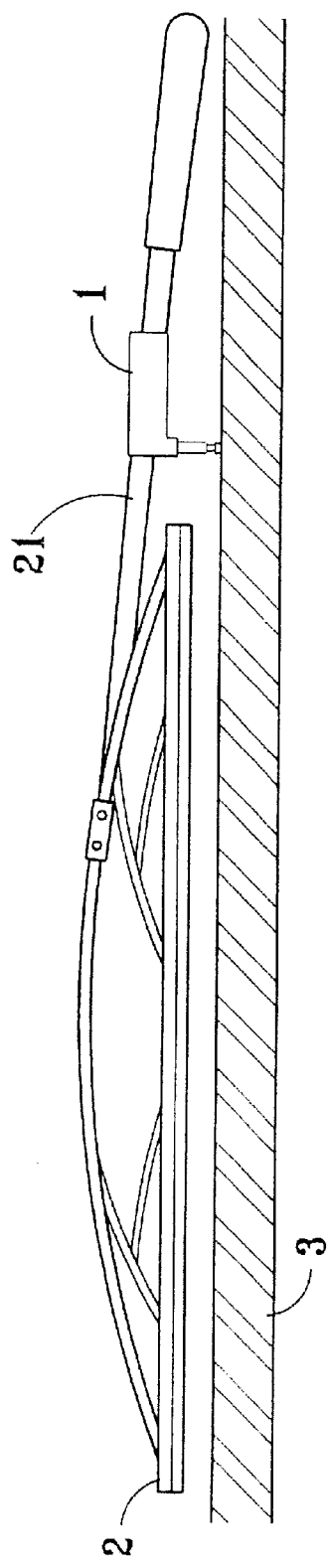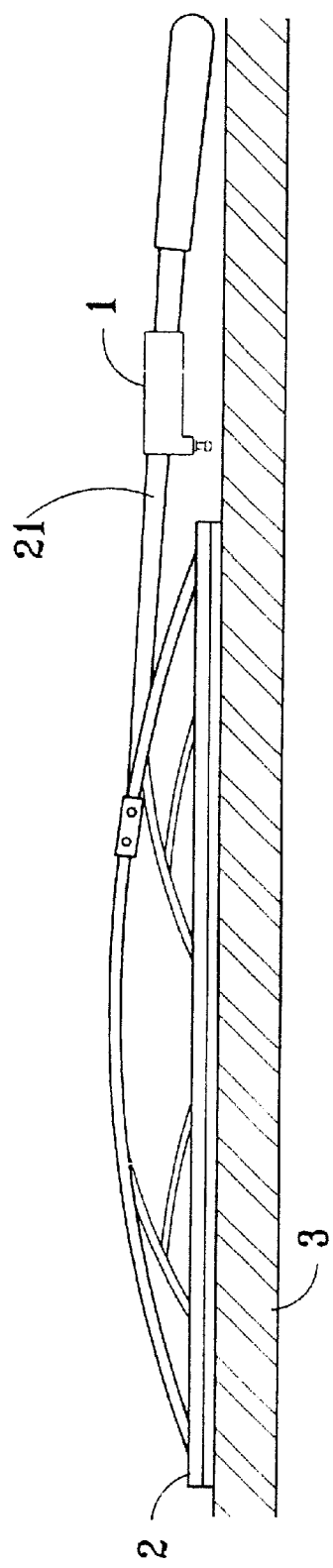
FIG. 1
FIG. 2

WINDSHIELD WIPER PROTECTOR

BACKGROUND OF THE INVENTION

1. Field of the Invention

The present invention relates to a windshield wiper protector, in particular, to a windshield wiper protector which lifts up the wiper from the surface of the car front window when not in use by control of the car engine initiating switch so as to prolong the lifetime of the wiper.

2. Description of the Prior Art

A windshield wiper is used to clear away wet muddy dust stuck on the car front window for enhancing the visibility of the driver.

The windshield wiper constantly in contact with the car window surface is subjected to the sun light, radiation, the wind attack, air contamination, and frictional abrasion with the windglass so that its lifetime is easily shortened by elastic fatigue.

For a remedy, a windshield wiper protector appeared on the market, which is capable of lifting up the wiper from the surface of the car front window when the wiper is not in use so as to prolong the wiper's lifetime. However, it is regretful that the product has not stimulated successfully the desire of users to use it since it is too complicated in construction resulting in a high rate of failure. Moreover, the product is manually operated that reduces its effectiveness a lot if the user often forgets its existence and leaves it in contact with the wind glass even not in use.

In view of this situation, the present inventor disclosed "Windshield Wiper Protector" and was patented by U.S. Pat. No. 6,286,175 which provided a windshield wiper protector with very satisfactory operational effect. Soon afterwards it was found that this new designed product was still unable to excite the user's interest because of its bulky size and high production cost that reflected to the market with a high sales price. Definitely, one step forward improvement is absolutely necessary.

In view of the foregoing situation, the inventor of the present invention thus wrestled with this problem once more by conducting intensive research based on repeated experiments and simulations with newly added controlling components such as relays and limit switches for further degree of protection for the windshield wiper, and finally has succeeded to come out with this ingeniously designed windshield wiper protector.

SUMMARY OF THE INVENTION

It is a main object of the present invention to provide a windshield wiper protector, which can lift up the wiper with a precise control movement, from the surface of the car front window when the wiper is not in use so as to prolong its lifetime.

A windshield wiper protector which can fulfil the above mentioned object comprises a protector housing, a driving motor, a relay, a pair of speed changing (reduction) gear units, a rack, and two limit switches. The protector housing is mounted on the arm of the windshield wiper, and the driving motor is equipped in the protector housing, the relay which being actuated by a car engine initiation switch, is for controlling starting and rotating direction of the motor. One of the speed reduction gear unit is in mesh with a screw threaded rod of the motor for serving as an input side, while the other speed reduction gear unit is in mesh with a rack for serving as an output side. One end of the rack is emerged out of the protector housing towards the front window of the car with an adjusting screw provided to the end thereof for adjusting its own length and fixed at the adjusted position with a nut. At both ends of the rack in the protector housing, there are formed two protuberances which are moved to touch the two correspondingly located limit switches as the rack displaces thereby transmitting signals to the relay for operation of the motor.

BRIEF DESCRIPTION OF THE DRAWINGS

The drawings disclose an illustrative embodiment of the present invention which serves to exemplify the various advantages and objects hereof, and are as follows.:

FIG. 1 is a schematic view showing the windshield wiper is lifted up from the front window by the protector of the present invention when the car is stopping or parking;

FIG. 2 is a schematic view showing the windshield wiper is brought to contact the front window by the protector of the present invention when the car is moving;

DETAILED DESCRIPTION OF THE PREFERRED EMBODIMENT

Referring to FIGS. 1 and 2, the windshield wiper protector 1 of the present invention is installed on a wiper arm 21 and its operation is controlled by the car engine initiation switch. The windshield wiper 2 is lifted up from the surface of the car front window 3 when the car is stopped or parked so as to prevent too early wearing of the wiper 2. When the car s started, the wiper 2 is brought down to contact the car front window 3 so that the wiper 2 is able to work.

Figure 3:
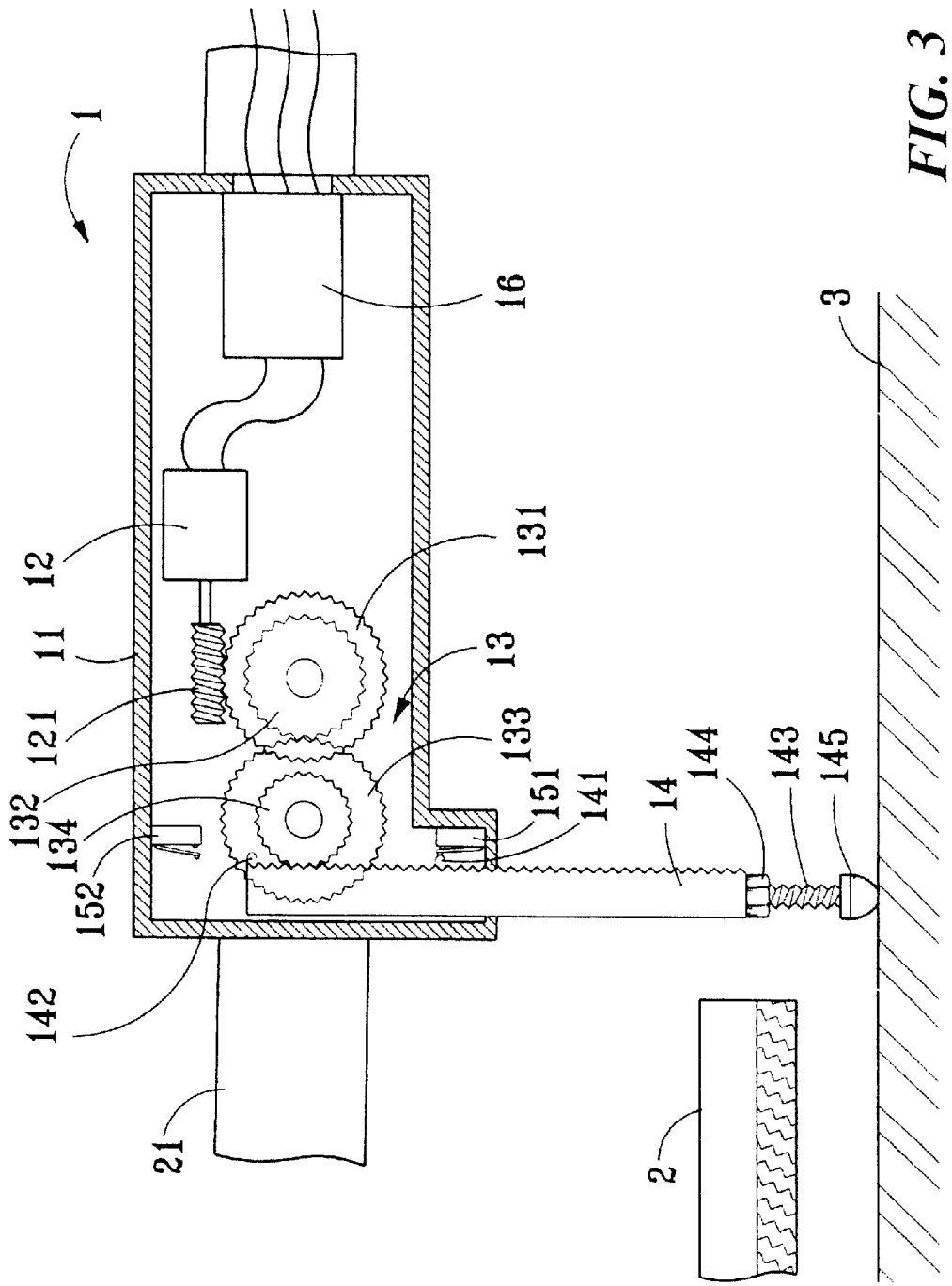
FIG. 3 is an illustrative view showing the relative location of the protector components when the car is stopping, or parking.
Figure 4:
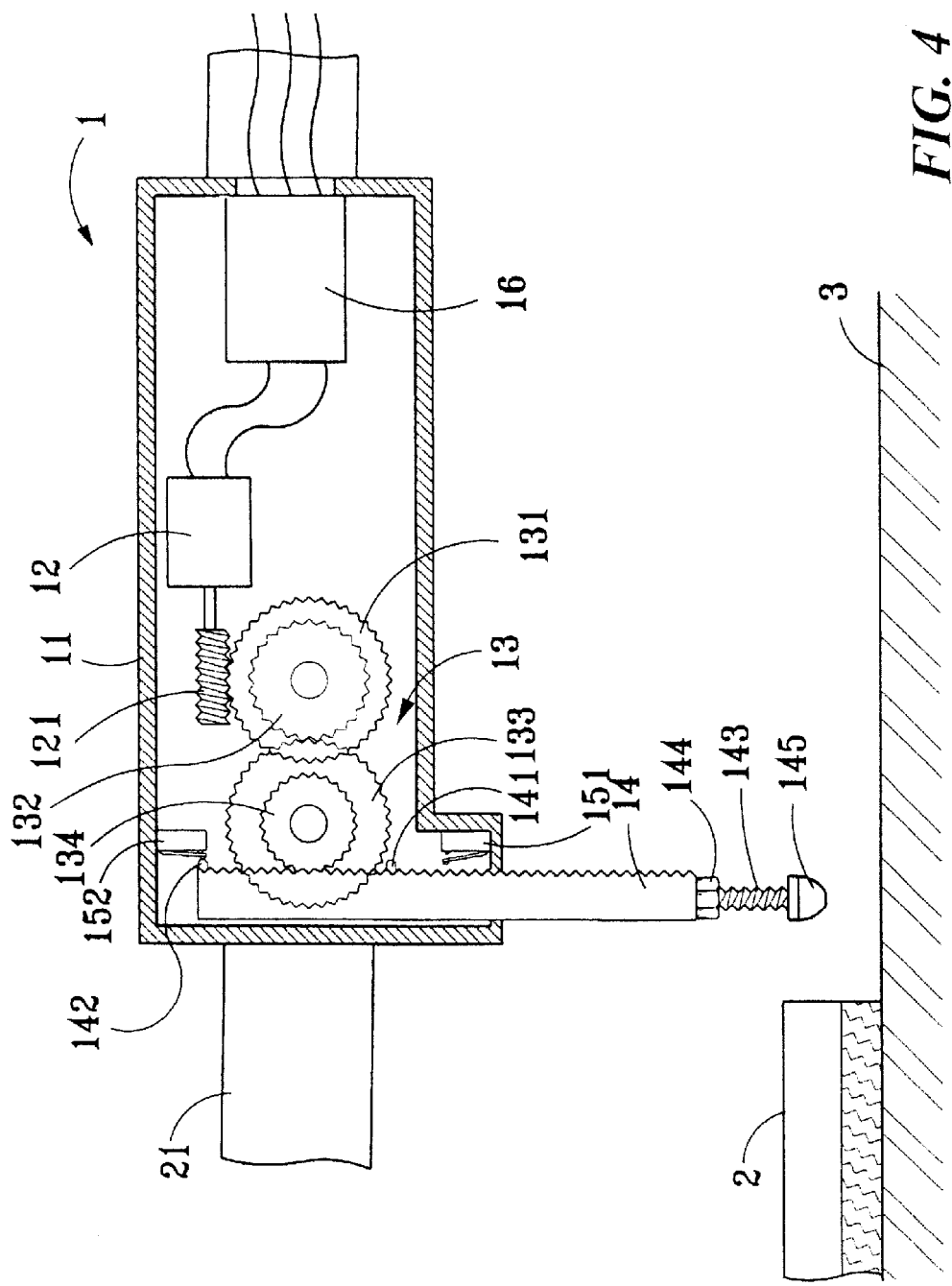
FIG. 4 is an illustrative view showing the relative location of the protector components when the car is moving.

Referring to FIGS. 3 and 4, it is observed that the aforementioned windshield wiper protector 1 comprises a protector housing 11 having a driving motor 12 within it. The starting and rotating direction of the motor 12 are controlled by a relay 16 according to a signal from the car engine initiation switch. A screw threaded rod 121 is extended from the output terminal of the motor 12, the rod 121 is in mesh with a driving gear 131 of a first speed changing (reduction) gear unit 13. The first speed reduction gear unit 13 further has a driven gear 132 having less teeth than that of its coaxial driving gear 121. The driven gear 132 is in mesh with a follower gear 133 of a second speed reduction gear unit, which has an output gear 134 of less teeth than that of its coaxial follower gear 133 so as to achieve two step speed reduction effect. The output gear 134 is in mesh with a rack 14 whose one end is emerged out of the protector housing 1 towards the car front window 3. At both sides of the rack 14 within the protector housing 11, there are formed two protuberances 141, 142 one respectively at each end, and also there are two limit switches 151,152 for confining the movable range of the rack 14 provided in both sides of the protector housing 11, wherein the switches 151 and 152 are respectively disposed near by the protuberances 141 and 142. At the end of the rack 14 emerged towards the front window 3 there are provided an adjusting screw 143 adjustable of its own length and a nut 144 for fixing the screw 143 at the position thereof. A protecting hood 145 made of rubber is provided to enclose the front tip of the adjusting screw 143 so as to avoid direct impingement of the screw 143 upon the car front window 3.

Referring to FIGS. 3 and 4, when the car is stopping or parking, the rack 14 is stretched forwards so that the wiper 2 is separated from the surface of the car front window 3 as shown in FIG. 3 thereby reducing possibility of shortening its lifetime. On the contrary, when the car is started, the driving motor 12 is actuated by the relay 16 to rotate, and the rack 14 retreats into the protector housing by driving torque of the motor 12 which being transmitted via the speed reduction gear unit 13. As soon as the protuberance 142 formed on the rear end of the rack 14 is brought to touch the limit switch 152, the limit switch 152 sends a signal to the relay 16 thereby the operation of the motor 12 is stopped. At this time the wiper 2 is just in contact with the windglass 3 ready for work. When the car engine ceases, the relay 16 actuates the motor 12 to rotate in reversed direction such that the rack 14 is stretched forwards by the driving torque transmitted via the speed reduction gear unit 13 thereby the wiper 2 is released from the surface of the front window 3 and gradually lifted up until the protuberance 141 formed on the front end of the rack 14 is brought to touch the limit switch 151, which sends a signal to the relay 16 for stopping operation of the motor 12 so as to keep the wiper 2 there at the position separately hanging over the surface of the car front window 3 as shown in FIG. 4.

The desired separation distance between the wiper 2 and the surface of the car front window 3 is made adjustable by loosening the nut 144 first, then stretching or retreating the adjusting screw 143 by turning it with the user's fingers, and then fixing the screw 143 at a desired position by tightening the nut 144.

Form the above description, it is understood that the windshield wiper protector of the present invention is able to lift up the wiper with a precise control movement from the car front window when it is not in use so as to keep away from contamination and prolong its lifetime. Such a merit is never possible for any conventional product.

Those who are skilled in the art will readily perceive how to modify the invention. Therefore, the appended claims are to be construed to cover all equivalent structures which fall within the true scope and spirit of the invention.

What is claimed is:

1. A windshield wiper protector comprising:

a protector housing installed on a wiper arm;

a driving motor equipped in said protector housing and a screw threaded rod being extended from the output terminal of said motor;

a relay electrically connected to said driving motor for controlling motor starting and direction of rotation according to a signal from a car engine initiation switch;

a first speed reduction gear unit whose input side being in mesh with said screw threaded rod of said driving motor;

a rack being in mesh with an output gear of a second speed reduction gear unit, and emerging one end out of said protector housing towards a car front window, and an adjusting screw adjustable of its own length and a fixing nut for fixing said screw being provided at the emerged end of said rack, at both sides of said rack within said protector housing being formed two protuberances; and two limit switches provided at two sides within said protector housing, each of them being respectively to be touched by said corresponding protuberance so as to control the operation of said driving motor with a signal.

2. The windshield wiper protector of claim 1, wherein said first speed reduction gear unit includes a driving gear in mesh with said screw threaded rod of said driving motor, said first speed reduction gear unit further has a coaxial driven gear formed with less teeth than that of said driving gear, said driven gear is in mesh with a follower gear of said second speed reduction gear unit which has an coaxial output gear of less teeth than that of said follower gear so as to achieve two stage speed reduction effect.

3. The windshield wiper protector of claim 1, wherein a protecting hood made of rubber is provided to enclose a front tip of said adjusting screw so as to avoid direct impingement of said screw upon the car front window.

* * * * *